Figure 2:
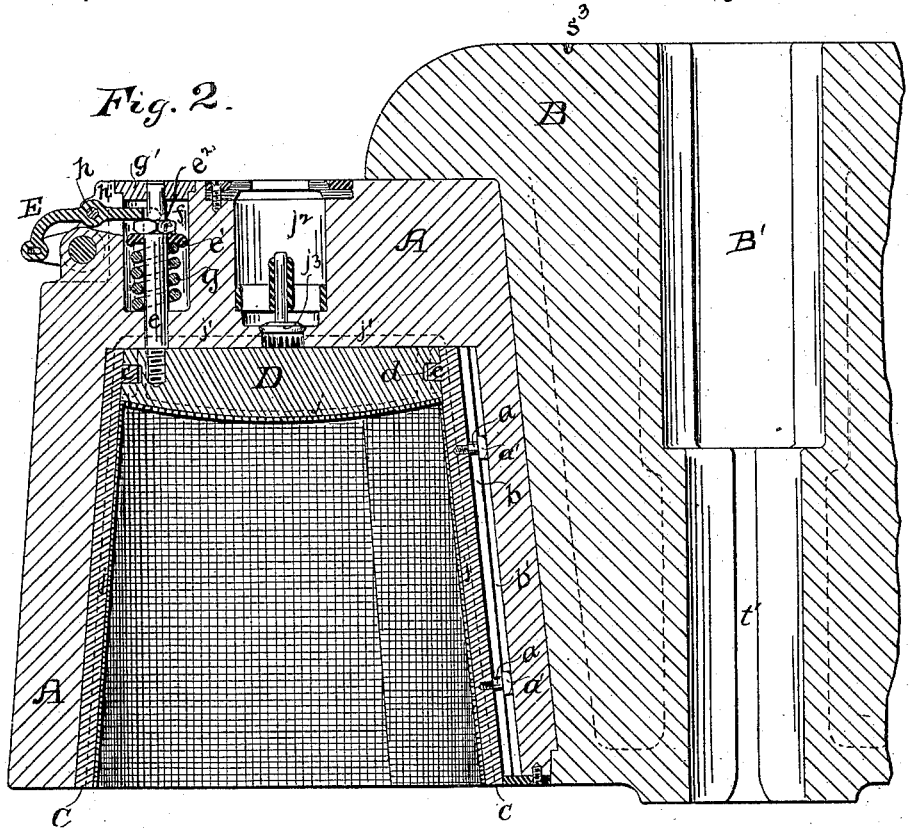

(No Model.) 5 Sheets—Sheet 1.

W. L. CHASE.
APPARATUS FOR FORMING OR MOLDING ARTICLES FROM PULP.

No. 298,728. Patented May 20, 1884.

Witnesses.
J. Walter Blandford,
W. C. Chaffee

Inventor,
William L. Chase
by Marcellus Bailey
his attorney

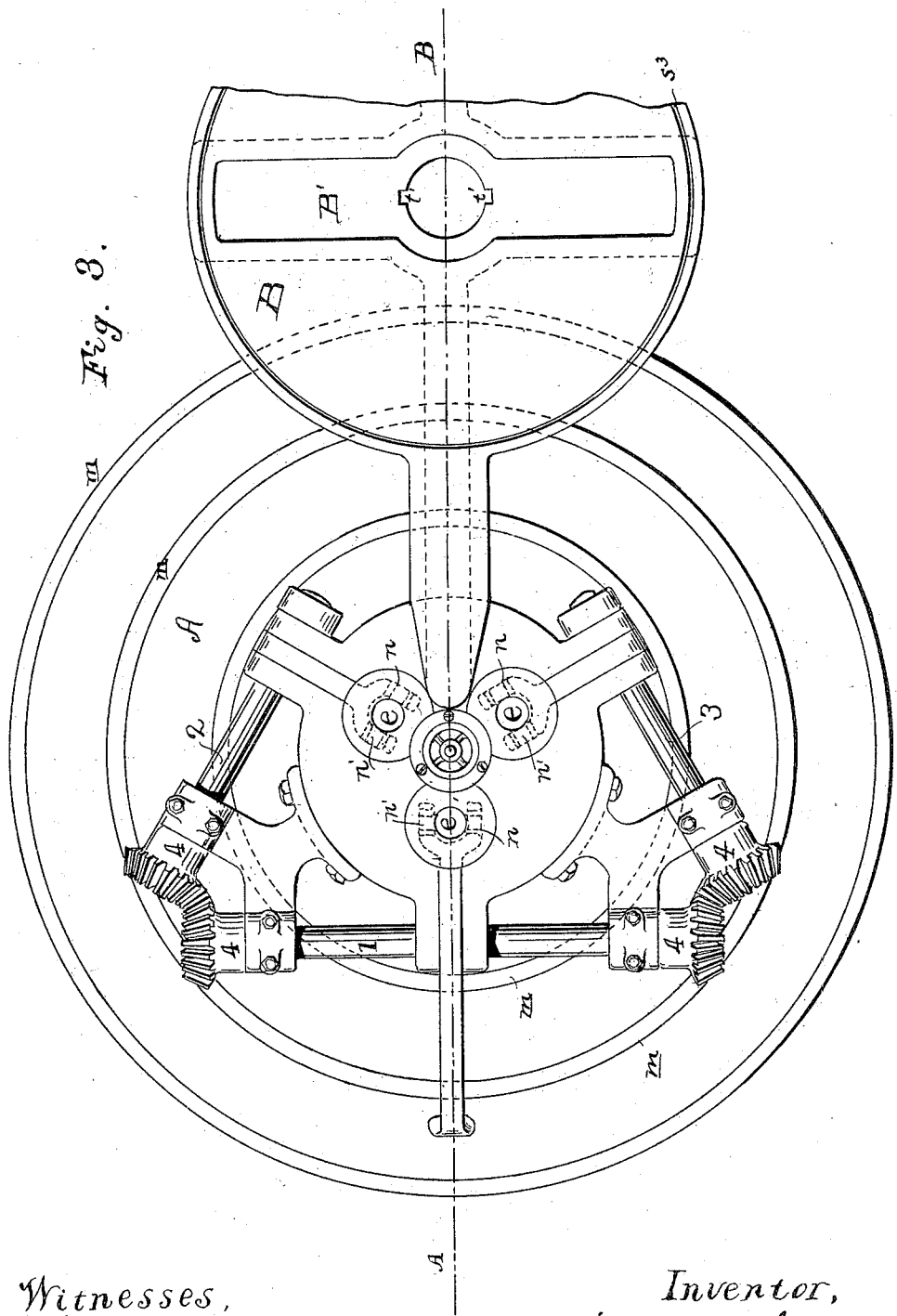

(No Model.)
W. L. CHASE.
APPARATUS FOR FORMING OR MOLDING ARTICLES FROM PULP.
No. 298,728. Patented May 20, 1884.
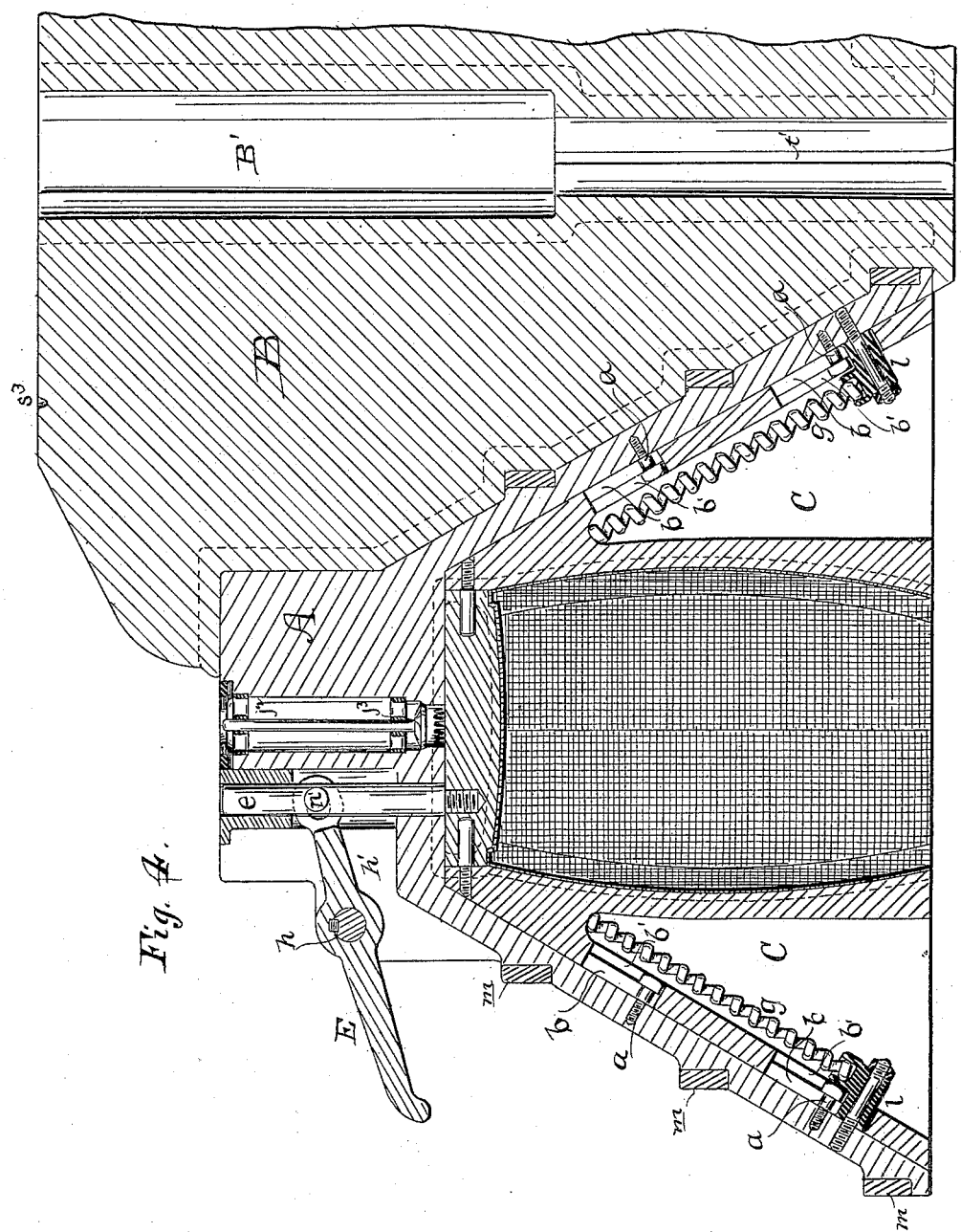
Witnesses,
J. Walter Blandford
W. C. Chaffee
Inventor,
William L. Chase
by Marcellus Bailey
his attorney.

(No Model.) 5 Sheets—Sheet 4.

W. L. CHASE.
APPARATUS FOR FORMING OR MOLDING ARTICLES FROM PULP.

No. 298,728. Patented May 20, 1884.

Witnesses,
J. Walter Blandford
W. C. Chaffee

Inventor,
William L. Chase
by Marcellus Bailey
his attorney

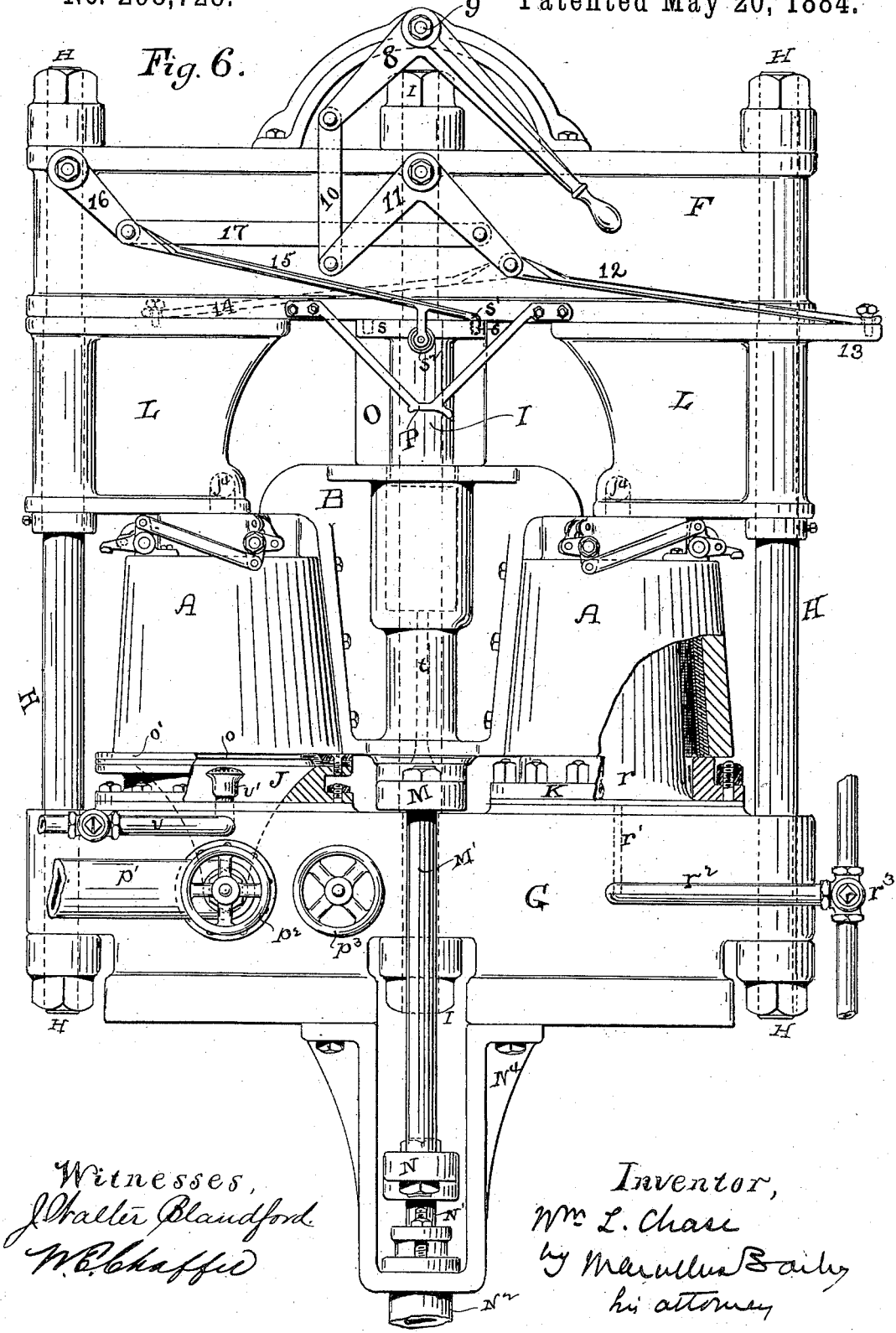

UNITED STATES PATENT OFFICE.

WILLIAM L. CHASE, OF PORTLAND, MAINE.

APPARATUS FOR FORMING OR MOLDING ARTICLES FROM PULP.

SPECIFICATION forming part of Letters Patent No. 298,728, dated May 20, 1884.

Application filed September 19, 1883. (No model.)

*To all whom it may concern:*

Be it known that I, WILLIAM L. CHASE, of Portland, in the county of Cumberland and State of Maine, have invented certain new and useful Improvements in Apparatus for Forming or Molding Articles from Pulp, of which the following is a specification.

It has been my object in this invention to secure the rapid and economical forming or molding of articles from pulp, and to facilitate the removal of the article from the die in which it is formed.

My invention is directed, mainly, to the die in which the article is formed, and is characterized by the combination, with the body of the die, of a lining composed of a set of sections or staves fitted together so as to present an unbroken inner surface of the desired shape for receiving the pulp deposit, and movable outwardly along the walls of the die, so as to expand and draw away from the article formed by the pulp deposit, thus releasing the latter and permitting it to drop from or to be readily removed from the die. In conjunction with the sectional lining I make use of a false bottom or its equivalent, which may be stationary, or, if desired, may be made movable outwardly with the sectional lining, which latter, however, in such case preferably expands independently of the said false bottom.

I desire to state at the outset that I am aware that expansible and collapsible dies are to some extent known in the arts; and also that a contractile die has been used in connection with outer pressing-dies for pressing between them an article previously formed from pulp and then placed over the contractile die, the latter being made collapsible for the purpose of permitting the removal of the article after the pressing operation. I am also aware that a mold for forming articles from pulp has been used consisting of an inner perforated collapsible core, and an outer set of staves or dies provided with means both to force them toward the inner core for the purpose of expressing water from the mass of pulp contained in the space between the core and die, and of compacting said pulp upon the core, and also to draw them away from the compacted mass, so that when the inner core is collapsed the molded article can be re-moved from the die; but I am not aware that a die has before been used or devised in which the pulp is deposited upon the inner face of a sectional lining, the sections of which are caused to travel away from and release the molded article by imparting to them a movement longitudinally or toward the mouth of the die. This feature, which is the main characteristic of my invention, permits me to mold plain articles with at least the same facility as permitted by the constructions above referred to, while it enables me, by the capacity it affords for rapid and sufficient expansion of the die, to remove the more complex forms of molded articles—such, for example, as the bilge-barrel, sewing-machine cover, &c.—with much greater facility. This and other features of my invention, which will be developed in the course of this specification, can best be explained and understood by reference to the accompanying drawings, in which—

Figure 1:
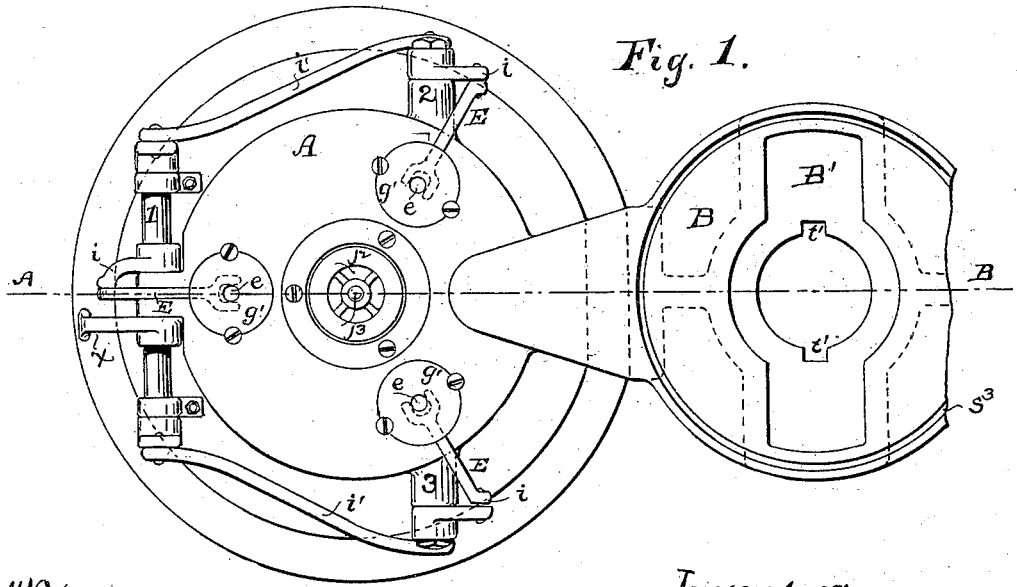
Figure 5:
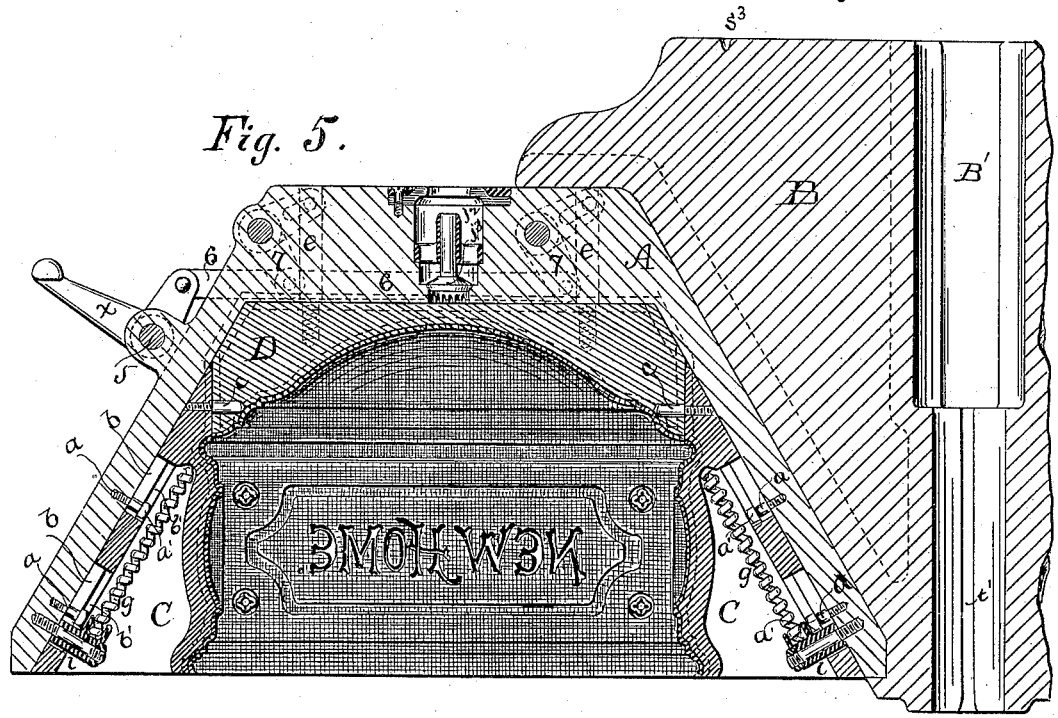
Figures 7, 8:
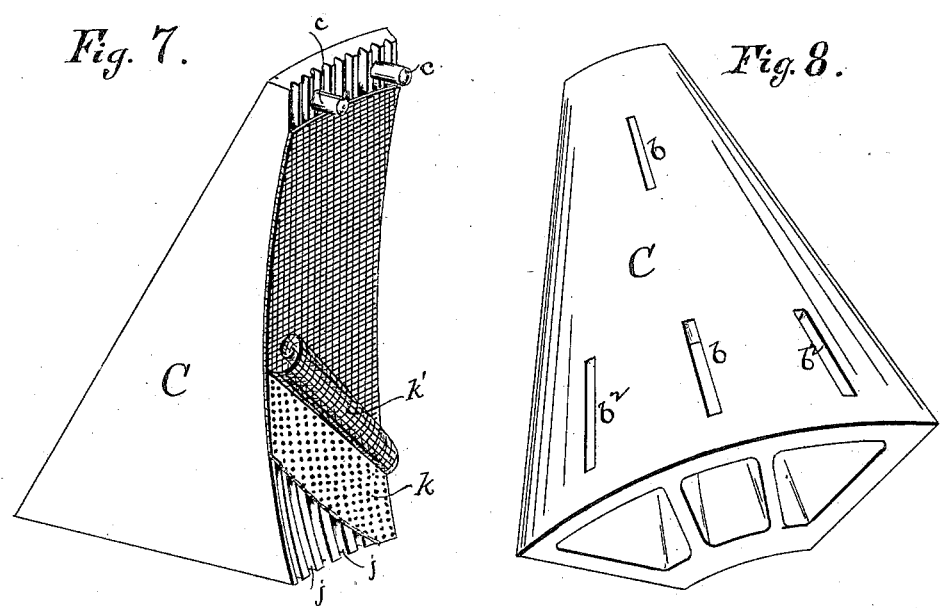

Figure 1 is a plan, and Fig. 2 is a sectional elevation on line A B, Fig. 1, of a die made in accordance with my invention and adapted to molding pails, butter-tubs, and articles of analogous form. Fig. 3 is a plan, and Fig. 4 is a sectional elevation on line A B, Fig. 3, of a die embodying my improvement and adapted to molding barrels, casks, kegs, &c., with one head out. Fig. 5 is a sectional elevation of my improved die adapted to molding sewing-machine cases, burial-cases, and articles of analogous form. Fig. 6 is a front elevation, partly in section, of a molding-machine in which the dies represented in the preceding figures may be operated, the dies shown in said machine being of the kind represented in Figs. 1 and 2. Figs. 7 and 8 are perspective views from different points of one of the lining sections or staves of the die. (Represented in Figs. 3 and 4.)

I will first describe in detail the construction of the several dies, and will then explain the machine in which the dies are used, and the mode of operating the same.

In Figs. 1 and 2, A is the body of the die, secured to the yoke B, which latter carries a pair of dies, and is arranged to revolve on a vertical axis in the machine, as will be hereinafter more fully explained in the description of the machine. The body of the die is hollow, and its inner walls are covered by the sectional shell or lining hereinbefore referred to. Said shell or lining, which may consist of two or more sections, according to the size and configuration of the article to be produced, in the present instance consists of three sections or staves, C. These staves are made of metal, are arranged in the die so as to slide longitudinally therein, and are formed so that when drawn into place their longitudinal edges meet and closely fit together, the sections in this position forming a practically continuous shell of the shape and size of the exterior of the article to be produced. Each section is guided in its longitudinal movements by bolts or pins and a guide-slot formed in the section and body of the die, respectively. In this instance, the T-headed guide bolts or pins $a$ are on the sections, and the guide-slots $b$ are in the contiguous face of the die A, each slot being undercut at $b'$ to receive the heads $a'$ of the guide-bolts with a view to hold the sections up in place against the walls of the die. The walls of the die, or those portions of said walls on which the sections bear and slide, flare outwardly or toward the mouth of the die, so that when the sections are moved longitudinally toward the mouth of the die they will expand or spread apart for the purpose hereinbefore specified, and so that when they are moved in the opposite direction, or up into their normal position in the die, they will be caused to contract or draw toward one another. I have before intimated that the die is provided with a false bottom, and that said false bottom can be stationary with respect to the sectional shell, or can be made movable longitudinally with the sections which preferably expand independently of the bottom. The latter arrangement, which is the one that will be found preferable, and more convenient in most cases, is represented in the drawings. The false bottom is represented at D. Its inner face has the shape of the bottom or head of the article, and its outer or upper face bears solidly against the head of the die A. It is of a size and shape to fit snugly within the upper ends of the sections C, and is provided with a peripheral groove, $d$, which is entered by lugs $c$ on the sections. Thus when the sections move longitudinally the false bottom will move with them, and at the same time will leave them free to spread apart or draw together, according to the direction of their longitudinal movement.

The mechanism for holding up in place the sections and false bottom, and for moving them lengthwise, can be widely varied. I prefer in every instance to hold the parts up into place in the die by spring action, so that when the parts are released from control of the mechanism by which they are moved outwardly, they will be at once returned automatically to position by the recoil of their spring or springs.

The spring-acting mechanism shown in Figs. 1 and 2 consists of guide-pins $e$—in this instance three in number—which are secured fast to the false bottom D, and pass loosely through holes in the head of the die A into recesses $f$ therein. In each recess is a spiral spring, $g$, encircling the pin $e$ therein, and confined between the bottom of the recess and a washer, $e'$, on the guide-pin, which washer is held in place by a nut, $e^2$, screwing on the upper end of the guide-pin. The recess is closed at top by a cap, $g'$, in which the pin takes a sliding bearing. By the stress of springs $g$ the false bottom, together with the sections of the shell, is held normally in the position shown in Fig. 2. The outward longitudinal movement of the parts is effected by moving the pins $e$ against the stress of these retracting-springs $g$. It is of course desirable to thus move all the pins simultaneously and together, to which end various mechanical devices may be availed of. The arrangement shown in Figs. 1 and 2 is as follows: With each pin is combined a lever, E, which may be termed a "discharging-lever," pivoted at $h$ to the head of the die A, and having its inner end extending through a side slot, $h'$, in the said head, so as to engage the pin $e$. The engagement is effected by forking the inner end of the lever, so that it may straddle the pin and rest on nut $e^2$. Under this arrangement it will be seen that when the outer ends of the discharging-levers are lifted their inner ends will bear down on nuts $e^2$, and will force down the pins $e$, with the result of imparting outward longitudinal movement to the parts D C of the die. To cause the discharging-levers to thus act simultaneously and together, I pin the outer end of each lever to the crank-arm $i$ of a rock-shaft, 1, 2, or 3, which shafts, by cranks and connecting-rods $i'$, are connected in such manner that when one shaft is rocked the others will be simultaneously and correspondingly moved. For instance, rock-shaft 1—to which the extraneous power for actuating the discharging mechanism is to be applied—is connected by cranks and connecting-rods $i'$ to both shafts 2 and 3. By lifting the handle $x$ of shaft 1 all the levers E will be tilted so as to cause them to push down the pins $e$, and thus impart outward longitudinal movement to the parts C D of the die. As soon as handle $x$ is released the springs $g$ assert themselves, and by their recoil retract the parts into normal position.

I remark here that the longitudinal movement requisite to loosen the sectional lining from the molded article is, in the majority of instances, but slight, so that there is no necessity for making provision for any very extended movement of any of the parts.

The inner faces of the lining-sections and false bottom are covered with grooves $j$, (see Fig. 7,) which, through passages $j'$, (shown by dotted lines in Fig. 2,) lead into the chamber $j^2$, through an opening controlled by a checkvalve, $f^3$, to prevent back-flow. The chamber $f^2$, which is in the head of die-body A, has a packing-ring at its upper end, and is intended to communicate with a waste-pipe leading to the exhaust apparatus, as will be understood by those acquainted with the art to which my invention relates. The grooved surface of each section and of the false bottom is covered by a sheet of perforated metal, $k$, covered in turn by a sheet of wire-gauze, $k'$, Fig. 7. With a view to arrest the passage of particles of pulp while permitting free passage of water, I have found it convenient in practice to have the perforations in the metal sheet about one-sixteenth of an inch in diameter, and to use a fine wire-gauze of about sixty mesh. The lining-section shown in Fig. 7 is one of those intended for the barrel-molding die shown in Figs. 3 and 4; but the construction there represented of the inner face of the section is common to all the dies referred to in this specification. The die represented in Figs. 3 and 4 is in its more important features similar to the die already described with reference to Figs. 1 and 2. The differences between them are found principally in the arrangement of the retracting-springs and of the discharging mechanism.

Like letters in Figs. 1 to 8, inclusive, indicate corresponding parts in all the figures; and during the progress of this specification I shall only describe parts which have not already been described by reference to preceding figures.

Referring now to Figs. 3 and 4, the staves or sections C—of which there are six—have a greater slant on their outer or bearing faces than in Figs. 1 and 2, and the interior bearing-surface of the die-body A has a correspondingly-increased flare, the object being to obtain, for a given extent of outward or longitudinal movement, a greater enlargement or spreading apart of the sections C, so as to permit the more ready passage of the bilge of the molded barrel or cask. This form of stave or section admits of the staves being made hollow or skeleton like, as illustrated more plainly in Fig. 8, their form being such as to allow the retracting-springs $g$ to be placed on the sides of the staves, where their action is more direct than when they are placed above and around the pins $e$, as in Figs. 1 and 2. Under this modification the spring at its lower or outer end is secured to a lug, $l$, which is bolted to the wall of the die-body A, and extends through the slot $b$. The slot $b$ is formed in the section or stave, and the T-headed bolts $a$ are attached to the die-body A, which is the reverse of the arrangement shown in Fig. 2. The T-heads of the guide-bolts are in a recess or enlarged groove, $b'$, in the stave or section, so that they may not interfere with the spring. There are as many springs as desired to each section. I prefer to use three. In this case the two which are placed one on each side of the central spring, whose lug $l$ extends through the slot $b$ of the guide-bolts, are attached at their lower ends to lugs, which project from the wall of the die-body A through special slots $b^2$, formed for them in the section or stave, as seen in Fig. 8. The springs at their upper ends bear against the sections and tend to force them, together with the false bottom D, home in the die. In the construction shown in Fig. 4 the die-body is strengthened by steel bands $m$, which embrace it.

In order to simultaneously operate the discharging mechanism, shafts 2 3 are connected to shaft 1 by beveled gears 4. The forked inner ends of the discharging-levers E have slots $n$ in them, which are entered by cross-pins $n'$ on the pins $e$.

In Fig. 5 the outer surface or backs of the sections C are given an increased slant for the same purpose as in Fig. 4. The shell or lining represented in this figure would, owing to the rectangular shape of the article to be formed, be made up of four staves or sections corresponding to the four sides of the article, the joints being made at the corners. The discharging mechanism resembles that in Figs. 1 and 2 with slight modification. The handle $x$ is on a crank-shaft, 5, whose cranks are, by connecting-rods 6, connected to the arms of elbow-levers 7, whose other arms engage cross-pins on pins $e$, as shown clearly by dotted lines. This construction contemplates four pins, $e$. In other respects the die in Fig. 5 is the same substantially as that in Figs. 3 and 4.

Before proceeding to a description of the machine, I remark that in some cases the false bottom may be fixed in position; or it may be made in section, which will be attached solidly to the corresponding lining-staves C, so as to move with them bodily; or it may be omitted entirely and the discharging mechanism connected directly to the staves, in which case the head of the die would serve as the false bottom, and would have a suitably-scored surface covered with perforated metal and wire-gauze, or would be otherwise suitably formed for the purpose of preventing passage of particles of pulp while affording free passage to water.

The frame of the machine in Fig. 6 consists of a cap, F, and base G, firmly bolted together by rods H H I, the two outer rods, H, being equidistant from the center one, I. There are a pair of dies, A, similar to the die in Figs. 1 and 2, which are connected to one and the same yoke, B, which is mounted so as to be capable of revolving on central rod, I. The dies A, diametrically opposite to one another, one on each side of the axis I, register with mouth-pieces J K on the base G. Mouth-piece J is where the pulp enters, which is deposited upon the interior of the die in the operation of forming the articles. It has a packing-ring, $o$, held down by a metal ring, $o'$, and loose at its inner edge, so that the pulp as it passes up under pressure may force the packing-ring against the mouth of the die, and thus make a tight joint. The pulp under pressure enters through pipe $p'$, controlled by valve $p^2$. The other mouth-piece, K, consists of a ring, which holds a flexible bag, $r$, (of somewhat similar form to the article to be made,) for pressing the molded article, the object of the arrangement being to permit the article to be pressed in the same die in which it is formed, and to permit the forming operation in one die to take place simultaneously with the pressing operation in the other die. This object is attained by mounting the pair of dies so that each may be brought over the parts J K successively, and so that when one is over one mouth-piece the other will be over the other mouth-piece. The bag $r$ communicates through a passage, $r'$, in the base with a pipe, $r^2$, (controlled by valve $r^3$,) through which hydraulic pressure is admitted to the interior of the bag. A valve of course is also provided for relieving the pressure when it is no longer required.

It is necessary to employ means to lock down the dies securely in place against the very great upward pressure which they are called upon to sustain. To this end I make use of swinging wings L, mounted one on each side rod, H, and connected to actuating mechanism whereby they may be swung over the dies so as to lock them, or away from them so as to release them, as desired. The actuating mechanism consists of an elbow-lever, 8, on the front of the machine, attached to a shaft, 9, supported in bearings on top of the machine, and extending from front to rear of the machine. One arm of lever 8 is the handle by which it is moved. The other, by a link, 10, is connected to one arm of a second elbow-lever, 11, which is pivoted to the frame and at its other end is pinned to a connecting-rod, 12, which is attached to an extension, 13, on the right-hand wing L. Shaft 9, at the rear, is connected by precisely the same means to the left-hand wing L, the connecting-rod 14 of which is shown in dotted lines. When the parts of the actuating mechanism are in the position shown in the drawings, the wings are in locking position over the dies. By swinging the handle end of lever 8, the two wings will be simultaneously rotated about a quarter-turn, or thereabout, so as to be moved entirely away from over the dies, leaving the latter free to be raised, as they must be before they can be revolved in order to clear the flexible bag $r$. The wings L have formed in them passages $j^4$, which, when said wings are in locking position, register with the mouths of chambers $j^2$ in the dies, and constitute the waste pipes or passages, hereinbefore referred to.

In order to raise the dies so as to clear the flexible bag $r$, the yoke B of the dies is capable not only of rotating, but also of sliding up and down on rod I, and it rests upon a cross-head, M, which is also capable of a similar sliding motion on said rod. This cross-head is, by two rods, M', (one at front and one at rear of machine,) connected to a second cross-head, N, below, which latter is fast to the piston-rod N' of a hydraulic jack, $N^2$, supported in a stirrup, $N^4$, on the under side of the base of the machine. Only the upper part of the jack is shown, and I have not deemed it requisite to represent the valves, &c., by which pressure is admitted to and relieved from it.

To enable the apparatus to properly withstand the heavy pressure which must be made use of, it is requisite to lock down not only the dies A, but also their supporting-yoke B. To this end I employ a central locking-wing, O, mounted and capable of rotating on rod I, which wing, by a connecting-rod, 15, jointed to an arm, 16, pivoted to the frame of the machine, and a link, 17, connected to said parts 15 16 at their joint, and pinned at its outer end to elbow-lever 11, is so connected with the mechanism for actuating the die-locking wings L that when the latter are swung back to release the dies the yoke-locking wing will be thrown into register with the chambered part B' (see Figs. 1 and 2) of yoke B, designed to receive said wing; and when, on the other hand, the die-locking wings are swung into locking-position, the yoke-locking wing will be turned out of register with chambered part B', and will thus lock down the yoke, in which latter position it is shown in Fig. 6.

Inasmuch as the locking-wing O, when in chamber B', must turn with the yoke B, it becomes necessary to provide a detachable connection between the locking-wing and its actuating-rod 15, and to so arrange this connection that it may automatically and at the proper times be made and broken. To this end two sockets, $s$, (indicated in dotted lines,) are formed in the head or upper end of the rotating wing O, on diametrically opposite sides of its axis, two sockets being needed inasmuch as the yoke B makes only a half-revolution for each pressure. The connecting-rod 15 has at its end a lug, $s'$, which enters one or the other of these sockets when the wing is out of register with the yoke. On the connecting-rod 15 is a loose wheel, $s^2$, which, when the yoke B is raised, is lifted by the latter, and consequently acts to lift the lug of the connecting-rod out of engagement with the wing. The wheel $s^2$ is so placed as to enter a circular groove, $s^3$, in the top of yoke B, Figs. 1, 3, concentric with the axis of revolution of the yoke, the object of this arrangement being to keep the rod 15 from lateral movement, which might throw it out of register with the sockets in the wing O. With a view to prevent the yoke from rotating before it is raised high enough to cause the dies to clear the flexible bag $r$, rod I, for a suitable distance on its lower part, is provided with splines $t$, (seen in dotted lines in Fig. 6,) which enter grooves $t'$, Figs. 1 and 3, in the lower part of the yoke. Until the yoke is raised out of engagement with these splines it cannot revolve.

In order to conveniently impart at the proper time the requisite movement to the discharging mechanism whereby the sectional lining of the dies is caused to expand or spread apart, I make use of a cam or wiper, P, located on the machine at such a point that when the die in which the formed article has been pressed and finished leaves the mouth-piece K to return to mouth-piece J, said wiper will meet the handle $x$ of the discharging mechanism, and will move it in the proper direction and to the necessary extent to cause the longitudinal movement of the die-sections requisite to loosen the molded article and permit its easy discharge from the die.

I have found in practice that the perforations in the die after a time become clogged with fine particles of pulp, thus impeding the free passage of water. To remedy this, I provide a pipe, $v$, which extends up into mouth-piece J, and terminates in a spray-nozzle or rose, $v'$, through which water under pressure can be forced into the die, thus washing out the lodged particles of pulp.

The waste-passages $j^4$ in the wings L connect with flexible tubing, which in turn is connected to a suitable exhaust-pump for conveying away the expressed water, or the tubing may in some instances be put in communication with proper waste-pipes without the intervention of a pump.

The operation of the apparatus is as follows: The dies A being in the position shown in Fig. 6, and locked by the wings L L O, valve $p^2$ is opened, thus admitting to the interior of the left-hand die A the fluid pulp, which is maintained under pressure in a suitable reservoir, (not shown,) whence it passes through pipe $p'$ into the die. The water contained in the pulp passes through the perforations and grooves in the sectional lining and false bottom into chamber $j^2$, and out and away through the discharge-passage $j^4$ in left-hand wing, until a thickness of pulp is deposited upon the inner face of the sectional lining or shell sufficient to make the molded article of requisite strength. This thickness can be regulated by the character and consistency of the pulp, by the degree of pressure maintained in the reservoir, and by the length of time the operation is continued, and is determined by trial. The proper thickness having been obtained, valve $p^2$ is closed, and valve $p^3$, which controls an escape-passage from mouth-piece J at the back of the machine, is opened, thus allowing the surplus pulp to flow out from the machine back into a stuff-chest, (not shown,) to be again pumped into the reservoir. Hand-lever 8 is now moved in the proper direction and far enough to revolve the locking-wings L L O a quarter-turn on their respective rods or axes, thus releasing the dies and leaving them free to be raised. Hydraulic pressure is admitted to jack $N^2$, and the dies are thereby lifted until they clear the flexible bag, at which time they are free to revolve. They are then given a half revolution on their axis I, the direction of revolution being such that the left-hand die A, which contains the deposited pulp, moves around by the rear of the machine. At the end of the half-revolution the dies will have reversed their position, the empty right-hand die being over mouth-piece J, and the left-hand die with its deposited film of pulp being over K. The dies are now lowered by relieving the hydraulic jack of pressure, thus bringing the die that has received the film of pulp down upon or about the flexible bag $r$, and they are locked in place by the locking-wings. The operation of depositing the pulp is now repeated with the second die, and while this is being done hydraulic pressure is admitted to the interior of flexible bag $r$, the bag is distended, and the pulp coating upon the interior of the dies upon which the deposit was first made is compacted to any extent within the strength of the die. A sufficient thickness of pulp having been obtained in the second die, that operation is arrested. The flexible bag $r$ in the first die is also relieved of pressure. The locking-wings are swung back and the dies are then lifted and given a half-revolution in the same direction as before. During this movement, the handle $x$ of the discharging mechanism of the die, containing the compacted and finished article, comes in contact with the cam or wiper P, and is thereby moved so as to actuate the discharging mechanism to cause the longitudinal movement and consequent expansion or spreading apart of the sections C of the lining, thus automatically loosening and detaching therefrom the formed article which is free to drop or descend from the die upon a ledge, stand, or table which may be placed below in proper position to receive it. Thus the operations of depositing a film of pulp upon the interior surface of one die and of pressing or compacting an already deposited film of pulp in the other die, take place contemporaneously.

In conclusion, I remark that a die provided with a sectional lining having the combined longitudinal and expanding movements hereinbefore set forth is adapted not only for forming and pressing, but also for smoothing the outer surfaces of articles which have been already formed and pressed. In this case—where it is used only for smoothing a dried article which contains little or no appreciable moisture—the inner faces of the sections C can of course be imperforate.

I also wish to state that while I have deemed it best to illustrate and describe, in connection with my improved dies, a machine in which they can be used, in order to enable others to more fully understand, not only the construction of the die, but also the method of operation of the same, yet as this machine embodies many features which adapt it for use with a die or dies of various other kinds, I desire it to be understood, therefore, that I do not here claim the machine, or those features of it which I believe to be of my own invention, but that I reserve the same for another application for Letters Patent.

Having described my improvements and the manner in which they may be practically carried into effect, what I claim herein as new and of my invention is as follows:

1. The combination, with the die having an outwardly-flaring shell-receiving recess, of a sectional shell or lining composed of two or more sections or staves adapted to fit together within the die, so as to present an unbroken inner surface of the shape to be imparted to the molded pulp article, and movable longitudinally upon the flaring inner walls of the die, so as to spread apart or draw together, according to the direction of said longitudinal movement, substantially as and for the purposes hereinbefore set forth.

2. The combination of the die formed with a flaring shell-receiving recess, a sectional shell or lining composed of two or more staves or sections movable longitudinally upon the flaring inner walls of the die, and mechanism for imparting simultaneous movement to all the staves or sections, the combination being and acting substantially as hereinbefore set forth.

3. The combination of the die formed with a flaring shell-receiving recess, or sectional shell or lining composed of two or more staves or sections movable longitudinally upon the flaring inner walls of the die, retracting-springs which maintain said sections in their normal or closed position, and discharging mechanism whereby said staves or sections may be moved longitudinally against the stress of their retracting-springs in the direction in which they will be caused to open or spread apart, substantially as hereinbefore set forth.

4. The combination, with the die provided with a flaring shell-receiving recess, of a sectional shell or lining composed of two or more sections or staves longitudinally movable upon the flaring inner walls of the die, so as to spread apart or draw together, according to the direction of said movement, a false bottom longitudinally movable with said staves, and mechanism for imparting said longitudinal movement, substantially as and for the purposes hereinbefore set forth.

5. The combination, with the die and the sectional lining thereof capable of combined lengthwise and lateral movement, of a false bottom connected with the lining-sections, so as to participate only in the lengthwise movement of the latter, substantially as hereinbefore set forth.

In testimony whereof I have hereunto set my hand this 18th day of September, 1883.

WM. L. CHASE.

Witnesses:
EWELL A. DICK,
J. WALTER BLANDFORD.